United States Patent
Lee et al.

(10) Patent No.: US 12,347,883 B2
(45) Date of Patent: Jul. 1, 2025

(54) BATTERY MODULE AND BATTERY INCLUDING THE SAME

(71) Applicant: LG Energy Solution, LTD., Seoul (KR)

(72) Inventors: Changhun Lee, Daejeon (KR); Junyeob Seong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 485 days.

(21) Appl. No.: 17/796,865

(22) PCT Filed: Mar. 12, 2021

(86) PCT No.: PCT/KR2021/003079
§ 371 (c)(1),
(2) Date: Aug. 1, 2022

(87) PCT Pub. No.: WO2021/221310
PCT Pub. Date: Nov. 4, 2021

(65) Prior Publication Data
US 2023/0057993 A1 Feb. 23, 2023

(30) Foreign Application Priority Data
Apr. 29, 2020 (KR) .......... 10-2020-0052263

(51) Int. Cl.
*H01M 10/613* (2014.01)
*H01M 10/6555* (2014.01)
(Continued)

(52) U.S. Cl.
CPC ....... *H01M 50/244* (2021.01); *H01M 10/613* (2015.04); *H01M 10/6555* (2015.04);
(Continued)

(58) Field of Classification Search
CPC ............. H01M 50/244; H01M 10/613; H01M 10/6555; H01M 10/6557; H01M 50/211;
(Continued)

(56) References Cited

U.S. PATENT DOCUMENTS 9,509,023 B2 * 11/2016 Katayama ........... H01M 10/613
2013/0045410 A1 2/2013 Yang et al.
(Continued)

FOREIGN PATENT DOCUMENTS

CN 103201870 B * 9/2016 ............... F28F 3/06
CN 107799488 A 3/2018
(Continued)

*Primary Examiner* — Kaity V Chandler
(74) *Attorney, Agent, or Firm* — Bryan Cave Leighton Paisner LLP (57) ABSTRACT

A battery module including: a battery cell stack that includes a plurality of battery cells; a housing accommodating the battery cell stack; a pair of end plates covering front and rear surfaces, respectively, of the battery cell stack and coupled to the housing; a heat sink positioned below a bottom portion of the housing, and at least two cooling ports connected to the heat sink. Each of the end plates includes: a first mounting portion positioned between a side end portion of the end plate and at least one of the at least two cooling ports adjacent to the side end portion, and extending in a protrusion direction of an electrode lead protruding from the battery cell; and a second mounting portion positioned between two adjacent cooling ports of the at least two cooling ports, and extending in the protrusion direction of the electrode lead protruding from the battery cell.

11 Claims, 4 Drawing Sheets

(51) Int. Cl.
*H01M 10/6557* (2014.01)
*H01M 50/244* (2021.01)
*H01M 50/211* (2021.01)

(52) U.S. Cl.
CPC ...... *H01M 10/6557* (2015.04); *H01M 50/211* (2021.01); *H01M 2220/20* (2013.01)

(58) Field of Classification Search
CPC ......... H01M 2220/20; H01M 10/6556; H01M 10/6567; H01M 50/262; H01M 10/623; H01M 10/6551; H01M 10/625; H01M 2220/30; H01M 50/20; Y02E 60/10; Y02T 10/70
See application file for complete search history.

(56) References Cited

U.S. PATENT DOCUMENTS

| | | | |
|---|---|---|---|
| 2014/0141306 A1 | 5/2014 | Kusunoki | |
| 2016/0149180 A1 | 5/2016 | Tokoo et al. | |
| 2018/0123105 A1 | 5/2018 | Tokoo et al. | |
| 2018/0166754 A1* | 6/2018 | Dudley | H01M 10/6567 |
| 2018/0205125 A1* | 7/2018 | Burgers | F28F 9/0204 |
| 2018/0241102 A1 | 8/2018 | Kim et al. | |
| 2019/0173064 A1 | 6/2019 | Lee et al. | |
| 2019/0366876 A1* | 12/2019 | Cheadle | F28D 1/035 |
| 2019/0372065 A1 | 12/2019 | Kawata et al. | |
| 2020/0067155 A1 | 2/2020 | Hwang et al. | |
| 2020/0168864 A1 | 5/2020 | Seo et al. | |
| 2020/0303761 A1* | 9/2020 | Ballantine | H01M 8/04089 |
| 2023/0352766 A1 | 11/2023 | Hwang et al. | |

FOREIGN PATENT DOCUMENTS

| | | | | |
|---|---|---|---|---|
| CN | 108028336 A | | 5/2018 | |
| CN | 208111507 U | | 11/2018 | |
| CN | 110770965 A | | 2/2020 | |
| CN | 110854320 A | | 2/2020 | |
| CN | 210274951 U | | 4/2020 | |
| CN | 212676355 U | * | 3/2021 | ............ Y02E 60/10 |
| EP | 3336958 | | 6/2018 | |
| JP | 2009-194331 A | | 8/2009 | |
| JP | 2013-526766 A | | 6/2013 | |
| JP | 2014-102947 A | | 6/2014 | |
| JP | 2015-111493 A | | 6/2015 | |
| JP | 6174388 B2 | | 8/2017 | |
| JP | 2018-527705 A | | 9/2018 | |
| JP | 2018-533167 A | | 11/2018 | |
| JP | 2019-212395 A | | 12/2019 | |
| KR | 10-2015-0035058 A | | 4/2015 | |
| KR | 10-2017-0084699 A | | 7/2017 | |
| KR | 10-2018-0038310 A | | 4/2018 | |
| KR | 10-2018-0123555 A | | 11/2018 | |
| KR | 10-2019-0105731 A | | 9/2019 | |
| KR | 10-2020-0021608 A | | 3/2020 | |

* cited by examiner

BATTERY MODULE AND BATTERY INCLUDING THE SAME

CROSS-REFERENCE TO RELATED APPLICATIONS

This application is a US national phase of international application No. PCT/KR2021/003079 filed on Mar. 12, 2021, and claims benefit of priority to Korean Patent Application No. 10-2020-0052263 filed on Apr. 29, 2020, the disclosures of which are incorporated herein by reference in its entirety.

TECHNICAL FIELD

The present invention relates to a battery module and a battery pack including the same, and more particularly, to a battery module with improved strength and a battery pack including the same.

BACKGROUND

In modern society, as portable devices such as mobile phones, laptops, camcorders, and digital cameras are used daily, there has been active development in technologies related to such mobile devices. In addition, rechargeable batteries that may be charged and discharged are used as power sources for electric vehicles (EVs), hybrid electric vehicles (HEVs), plug-in hybrid electric vehicles (P-HEV) as a solution to air pollution such as existing gasoline vehicles using fossil fuels, and thus, the need for the development of rechargeable batteries is on the rise.

Currently commercialized rechargeable batteries include nickel cadmium batteries, nickel hydride batteries, nickel zinc batteries, and lithium rechargeable batteries. Among them, lithium rechargeable batteries rarely have a memory effect when compared to nickel-based rechargeable batteries, and thus the lithium rechargeable batteries have come into prominence based on the advantages of free charging and discharging, a very low self-discharge rate, and high energy density.

These lithium rechargeable batteries mainly use a lithium-based oxide and a carbon material as a positive electrode active material and a negative electrode active material, respectively. A lithium rechargeable battery includes an electrode assembly in which a positive electrode plate and a negative electrode plate to which a positive electrode active material and a negative electrode active material are respectively applied with a separator interposed therebetween and a battery case for sealing and accommodating the electrode assembly together with an electrolyte.

In general, lithium rechargeable batteries may be classified as a can-type rechargeable battery in which an electrode assembly is embedded in a metal can and a pouch-type rechargeable battery in which an electrode assembly is embedded in a pouch of an aluminum laminate sheet depending on a shape of an exterior material.

When the rechargeable batteries are used in small devices, two or three battery cells are included, but when the rechargeable batteries are used in mid- to large-sized devices such as automobiles, a battery module in which a plurality of battery cells are electrically connected is used. In such a battery module, a plurality of battery cells are connected in series or parallel to each other to form a battery cell stack, thereby improving capacity and power. In addition, one or more battery modules may be mounted together with various control and protection systems such as a battery management system (BMS) and a cooling system to form a battery pack.

In the case of a rechargeable battery, when a temperature is higher than an appropriate temperature, the performance of the rechargeable battery may deteriorate, and in severe cases, there is a risk of explosion or ignition. In particular, the temperature of a plurality of rechargeable batteries, i.e., a battery module or battery pack having battery cells, may increase more rapidly and severely because heat emitted from the plurality of battery cells adds up in a narrow space. In other words, high power can be generated by a battery module in which a plurality of battery cells are stacked and a battery pack equipped with such a battery module, but it is not easy to remove heat generated from the battery cells during charging and discharging. If heat dissipation of the battery cell is not performed properly, deterioration of the battery cell is accelerated and a lifespan thereof is shortened, and the possibility of explosion or ignition increases.

Moreover, a battery module included in a vehicle battery pack may be frequently exposed to direct sunlight and may be subjected to high temperature conditions such as in the summer or in desert areas. Therefore, when configuring the battery module or battery pack, it may be very important to secure a stable and effective cooling performance.

To this end, a heat sink for cooling may be integrally formed with the battery module. However, the of a configuration for injecting a refrigerant into the heat sink may cause a structurally weak portion. In particular, when the battery module has a large area to increase capacity, there is a higher possibility that a portion vulnerable to vibration or impact occurs, and thus, development of a unit for supplementing the problem is required.

SUMMARY

The present invention has been made in an effort to provide a battery module having improved structural stability, while securing cooling performance, in a large battery module, and a battery pack including the same.

However, the problems to be solved by the exemplary embodiments of the present invention are not limited to the above problems and may be variously expanded within the scope of the technical idea included in the present invention.

According to an exemplary embodiment of the present invention, a battery module includes: a battery cell stack in which a plurality of battery cells are stacked; a housing accommodating the battery cell stack; a pair of end plates covering a front surface and a rear surface of the battery cell stack and coupled to the housing; a heat sink positioned below a bottom portion of the housing, and at least two cooling ports connected to the heat sink to supply a refrigerant to the heat sink, wherein the end plate includes: a first mounting portion positioned between a side end portion of the end plate and one of the at least two cooling ports adjacent to the side end portion, and extending in a protrusion direction of an electrode lead protruding from the battery cell; and a second mounting portion positioned between two adjacent cooling ports of the at least two cooling ports, and extending in the protrusion direction of the electrode lead protruding from the battery cell.

The first mounting portion and the second mounting portion may each include a through-hole formed to penetrate through the first and second mounting portions, in a direction perpendicular to the protrusion direction.

One of the at least two cooling ports may be a refrigerant injection port, and the other of the at least two cooling ports may be a refrigerant discharge port.

The housing may include at least two housing protrusions that protrude from a bottom portion of the housing at positions that correspond respectively to the at least two cooling ports.

A bottom surface of the housing may constitute an upper plate of the heat sink, and the bottom portion of the housing may be in contact with the refrigerant.

The heat sink may include a depressed portion recessed from a plate-shaped body, and the depressed portion and an upper plate formed by the bottom surface of the housing may be coupled to form a refrigerant flow path.

The depressed portion may be a U-shaped tube, and the bottom portion may be positioned on an open upper side of the U-shaped tube.

According to another exemplary embodiment of the present invention, a battery pack includes the at least one battery module and a pack frame positioned below the heat sink to accommodate the battery module.

The first mounting portion and the second mounting portion may each include a through-hole formed to penetrate through the first and second mounting portions in a direction perpendicular to the protrusion direction. The pack frame may include a fastening hole at a position corresponding to the through hole and include a mounting bolt coupled to the fastening hole of the pack frame through the through hole.

Two first mounting portions may be included, and there may be three or more points at which the first and second mounting portions and the fastening hole are coupled.

According to another exemplary embodiment of the present invention, a device includes the at least one battery pack described above.

According to exemplary embodiments, a battery module having improved cooling performance even in a large area through an integrated battery module structure of a housing and a heat sink and having improved structural stability for vibrations and impact and a battery pack including the same may be provided.

DETAILED DESCRIPTION

Hereinafter, exemplary embodiments of the present invention will be described in detail with reference to the accompanying drawings to allow those skilled in the art to practice the present invention. The present invention may be implemented in various different forms and is not limited to the examples as described herein.

Portions unrelated to the description may be omitted to more clearly describe the present invention, and the same or similar components may be denoted by the same reference numerals throughout the present specification.

Further, the size and thickness of each component shown in the drawings may be arbitrarily shown for convenience of explanation, and therefore, the present invention is not necessarily limited to the shown exemplary embodiments in the drawings. In the drawings, the thickness of various layers, regions, etc., may be exaggerated for clarity. In the drawings, the thickness of partial layers and regions may be exaggerated for convenience of explanation.

Further, it will be understood that when an element such as a layer, film, region, or substrate is referred to as being "above" or "on" another element, it may be "directly above" the other element, or intervening elements may also be present. In contrast, when an element is referred to as being "directly above" another element, there are no intervening elements present. Further, when an element is "above" or "on" the reference portion, it may mean that the element is positioned above or below the reference portion, and it may not necessarily mean that the element is "above" or "on" toward an opposite direction of gravity.

In addition, unless explicitly described to the contrary, the word "comprise", and variations such as "comprises" or "comprising", will be understood to imply the inclusion of stated elements but not the exclusion of any other elements.

Throughout the specification, "in plan view" means that a target element is viewed from above, and "in cross-sectional view" means that a target element taken vertically is viewed from the side.

Figure 1:
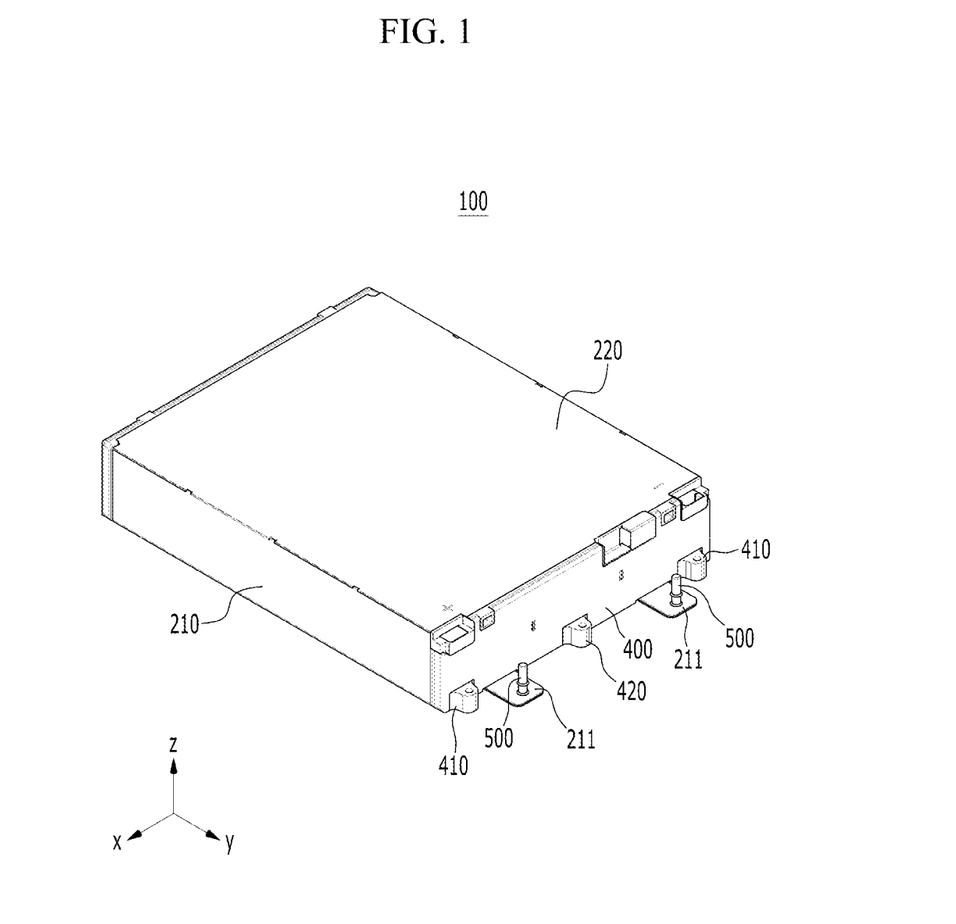
FIG. 1 is a perspective view of a battery module according to an exemplary embodiment of the present invention.
Figure 2:
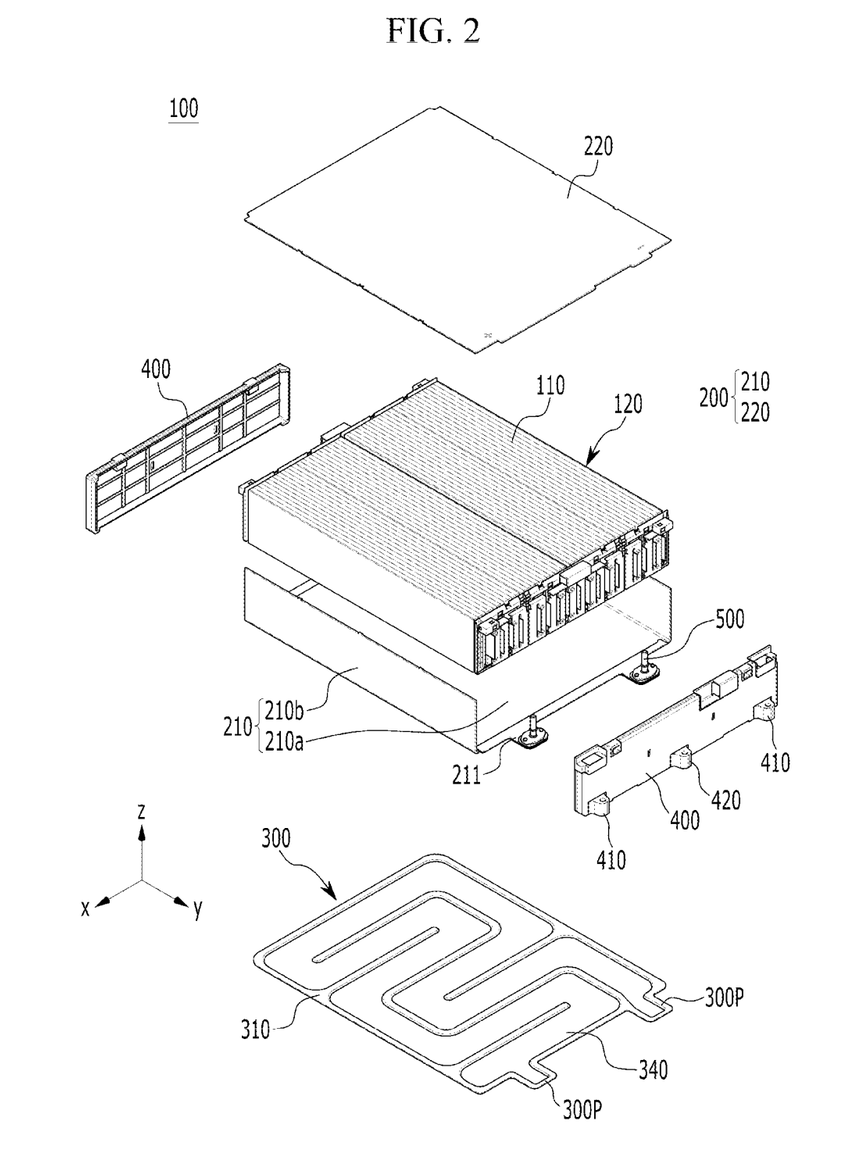
FIG. 2 is an exploded perspective view of the battery module of FIG. 1.
Figure 3:
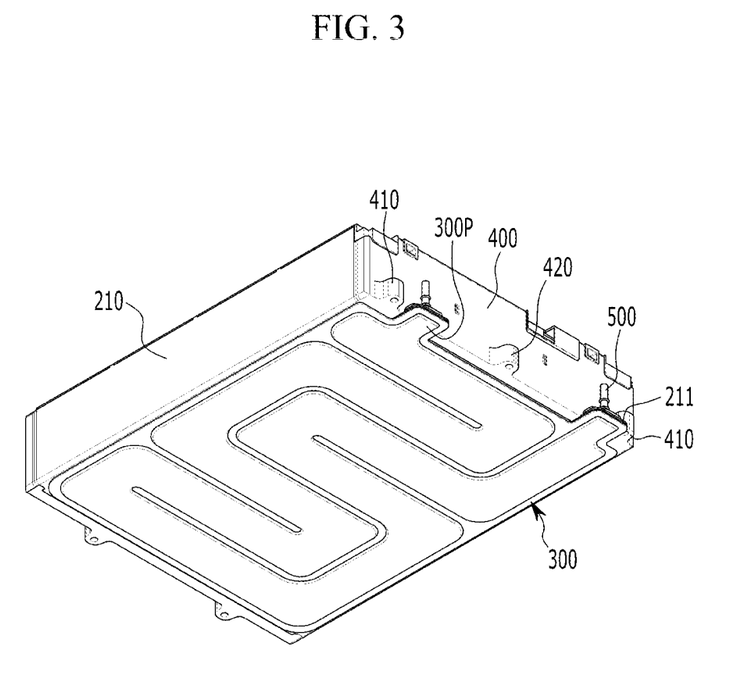
FIG. 3 is a bottom perspective view of the battery module of FIG. 1 when viewed in a z-axis direction.

FIG. 1 is a perspective view of a battery module according to an exemplary embodiment of the present invention, FIG. 2 is an exploded perspective view of the battery module of FIG. 1, and FIG. 3 is a bottom perspective view of the battery module of FIG. 1 as viewed in a z-axis direction.

As illustrated in FIGS. 1 to 3, a battery module 100 according to an exemplary embodiment of the present invention includes a battery cell stack 120 in which a plurality of battery cells 110 are stacked, a housing 200 accommodating the battery cell stack 120, a pair of end plates 400 positioned on both open sides (a y-axis direction and the opposite direction) of the housing 200 such that they correspond to each other to cover the battery cell stack 120, and a cooling port 500 for cooling the battery module 100. In addition, the battery module 100 may include a heat sink 300 positioned below a bottom portion 210a of the housing 200 and may include at least two cooling ports 500 supplying a refrigerant to the heat sink 300 and discharging the refrigerant from the heat sink 300.

The battery cell 110 may be a pouch-type battery cell. Such a pouch-type battery cell may be formed by accommodating an electrode assembly in a pouch case of a laminate sheet including a resin layer and a metal layer and then thermally sealing an outer periphery of the pouch case. In this case, the battery cell 110 may be formed in a rectangular sheet-like structure. A plurality of battery cells 110 may be configured, and the plurality of battery cells 110 are stacked to be electrically connected to each other to form the battery cell stack 120. In particular, as shown in FIG. 2, a plurality of battery cells 110 may be stacked in a direction parallel to an x-axis.

The housing 200 accommodating the battery cell stack 120 may include an upper cover 220 and a U-shaped frame 210.

The U-shaped frame 210 may include a bottom portion 210a and two side portions 210b extending upward from the two end portions of the bottom portion 210a. The bottom portion 210a may cover a lower surface (in a direction opposite to the z-axis) of the battery cell stack 120, and the two side portions 210b may cover both side surfaces of the battery cell stack 120 (in x-axis direction and a direction opposite thereto).

The upper cover 220 may be formed in a plate-shaped structure that covers the lower surface covered by the U-shaped frame 210 and the upper surface (the z-axis direction) other than the two side surfaces. The upper cover 220 and the U-shaped frame 210 may be coupled to each other by welding or the like in a state in which corresponding edge portions thereof are in contact with each other, thereby forming a structure that covers the battery cell stack 120 up, down, left, and right. The battery cell stack 120 may be physically protected through the upper cover 220 and the U-shaped frame 210. To this end, the upper cover 220 and the U-shaped frame 210 may include a metal material having a predetermined strength.

Meanwhile, although not specifically illustrated, the housing 200 according to the modified example may be a mono frame in the form of a metal plate in which an upper surface, a lower surface, and both side surfaces are integrated. That is, the housing 200 may be manufactured by extrusion molding to have a structure in which the upper surface, the lower surface, and both side surfaces are integrated, rather than a structure in which the U-shaped frame 210 and the upper cover 220 are coupled to each other.

The housing 200 according to the present exemplary embodiment may include a housing protrusion 211 formed so that the bottom portion 210a of the housing 200 extends to pass through the end plate 400. Here, the refrigerant introduced and discharged by the cooling port 500 connected to an upper surface of the housing protrusion 211 may be supplied to and discharged from the heat sink 300 through the housing protrusion 211.

The housing protrusion 211 and the cooling port 500 connected thereto may be disposed to be spaced apart from each other along one side of the housing 200, for example, one side thereof parallel to the x-axis direction of the drawing. The bottom portion 210a of the housing 200 constitutes an upper plate of the heat sink 300, and a depressed portion 340 of the heat sink 300 and the bottom portion 210a of the housing 200 may form a refrigerant flow path.

The heat sink 300 may be formed below the housing 200, and may include a lower plate 310 forming a skeleton of the heat sink 300 and directly coupled to the bottom portion 210a of the housing 200 by welding or the like and the depressed portion 340 as a path through which the refrigerant flows. In addition, the heat sink 300 may include a heat sink protrusion 300P protruding from one side of the heat sink 300 to a portion in which the housing protrusion 211 is positioned.

The heat sink protrusion 300P and the housing protrusion 211 may be directly coupled to each other by welding or the like. The depressed portion 340 of the heat sink 300 corresponds to a portion in which the lower plate 310 is recessed downward. The depressed portion 340 may be a U-shaped tube in a cross-section cut in an x-y plane perpendicular to a direction in which a coolant flow path extends, and the bottom portion 210a may be positioned on an open upper side of the U-shaped tube. As the heat sink 300 is in contact with the bottom portion 210a, a space between the depressed portion 340 and the bottom portion 210a becomes refrigerant flow path, i.e., a region through which the refrigerant flows. Accordingly, the bottom portion 210a of the housing 200 may be in direct contact with the refrigerant.

There is no particular limitation on a manufacturing method of the depressed portion 340 of the heat sink 300, but the U-shaped depressed portion 340 with an open upper side may be formed by providing a structure recessed with respect to the plate-shaped heat sink 300. The bottom portion 210a of the housing 200 may be joined to a portion of the lower plate 310 in which the depressed portion 340 is not formed in the heat sink 300 by welding. As such, through the integrated cooling structure of the bottom portion 210a of the housing 200 and the heat sink 300, a load of the battery cell stack 120 accommodated in the housing 200 may be supported, rigidity of the battery module 100 may be reinforced, and cooling performance, as described above, may be improved. In addition, the lower plate 310 and the bottom portion 210a of the housing 200 may be sealed through welding, etc., so that the refrigerant may flow without leakage in the depressed portion 340 formed inside the lower plate 310. Meanwhile, the refrigerant, as a medium for cooling, may be cooling water, but there is no particular limitation.

Figure 4:
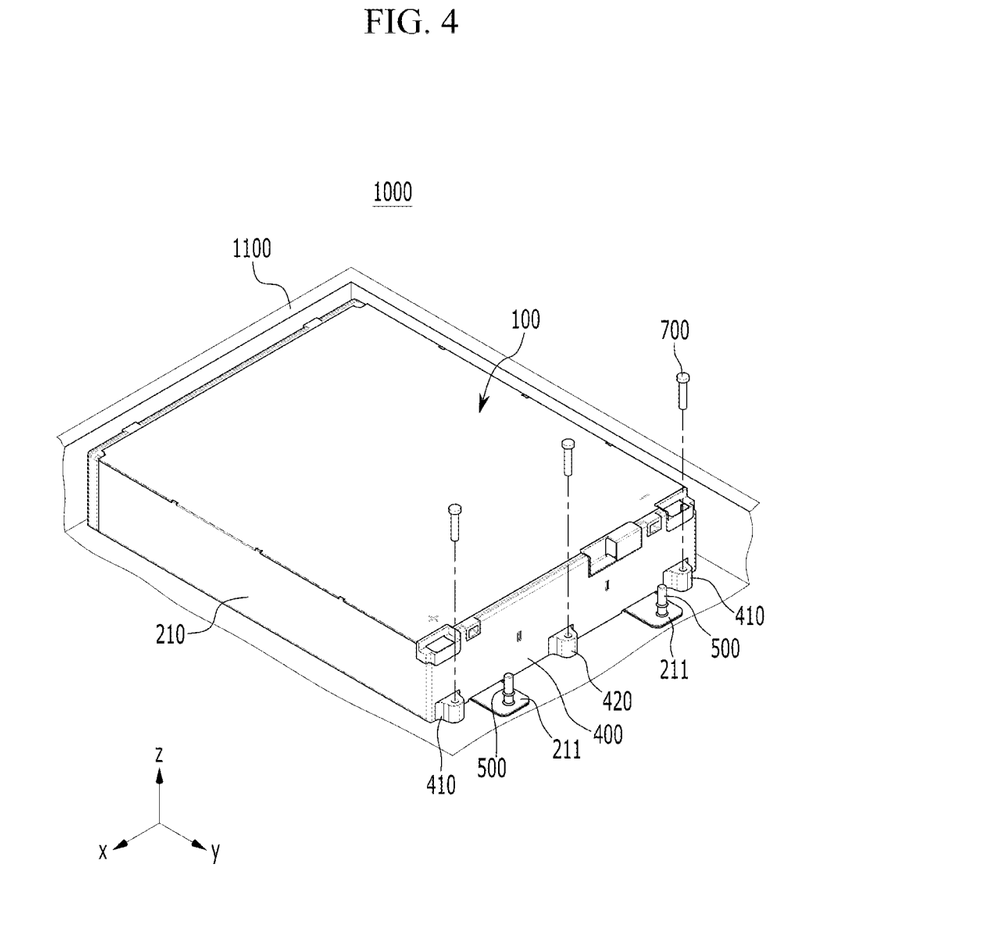
FIG. 4 is a partial perspective view of a battery pack according to an exemplary embodiment of the present invention.

Meanwhile, although not shown, a thermally conductive resin layer including a thermal conductive resin may be positioned between the bottom portion 210a of the housing 200 of FIG. 4 and the battery cell stack 120. The thermal conductive resin layer may be formed by applying a thermal resin to the bottom portion 210a and curing the applied thermal conductive resin.

The thermally conductive resin may include a thermally conductive adhesive material, and specifically, may include at least one of a silicone material, a urethane material, and an acrylic material. The thermally conductive resin may be in a liquid phase when applied and may be cured after being applied to fix one or more battery cells 110 constituting the battery cell stack 120. In addition, the thermally conductive resin may have excellent thermal conductivity to quickly transfer heat generated in the battery cell 110 to a lower side of the battery module.

The pair of end plates 400 may be positioned on both open sides (the y-axis direction and the opposite direction) of the housing 200 such that they corresponding to each other to cover the battery cell stack 120. The end plates 400 may physically protect the battery cell stack 120 and other electrical components from external impact. Meanwhile, although not specifically illustrated, a busbar frame on which a busbar is mounted and an insulating cover for electrical insulation may be positioned between the battery cell stack 120 and each of the pair of end plates 400.

In addition, each of the pair of end plates 400 may include a plurality of mounting portions 410 and 420 for fixing the battery module 100 to a pack case of a battery pack to be described later. The plurality of mounting portions 410 and 420 may protrude and extend from a side opposite to the side on which the battery cell stack 120 is positioned with respect to the respective end plate 400. That is, the plurality of mounting portions 410 and 420 are formed to extend in a protrusion direction (the y-axis direction) of the electrode lead protruding from the battery cell 100 included in the battery cell stack 120.

Among them, the first mounting portion 410 may be positioned adjacent to both side end portions of the end plate 400, that is, both end portions in the x-axis direction in the accompanying drawings. Both end portions of the end plate 400 may be stably fixed by the first mounting portion 410. The first mounting portion 410 may be provided on both of a pair of end plates 400 disposed at the respective end portions of the housing 200.

The second mounting portion 420 is disposed at a position between two adjacent cooling ports 500 of the at least two cooling ports 500. For example, as shown in the drawing, when the two cooling ports 500 are provided, the second mounting portion 420 may be disposed between the two cooling ports 500.

In related art, only the end portion of the end plate 400, without this second mounting portion 420, is configured to be fixed, but as the area of the battery module 100 increases, a portion vulnerable to vibrations and impact further increases, thereby increasing the possibility of damage. In particular, as the heat sink 300 is integrally formed on the bottom portion 210a of the housing 200, structural deformation of the housing protrusion 211 protruding from the bottom portion 210a of the housing 200 and the like can occur, and structural weakness may be more problematic in the portion in which the structure is deformed. As the number of connection portions between components, such as a connection portion between the cooling ports 500 and the housing protrusion 211 and a coupling portion between the lower plate 310 of the heat sink 300 and the housing 200, increases, the possibility of damage due to vibrations and impact may increase.

However, in an exemplary embodiment of the present invention, since the second mounting portion 420 is further provided between adjacent cooling ports 500 as described above, the battery module 100 may be stably fixed to increase strength for vibrations and impact even in a structure in which the cooling ports 500 and the heat sink 300 are integrally formed and the structure has a large area, and damage to a portion in which the cooling ports 500 and the heat sink 300 are connected to the housing 200 or the like may be prevented.

In addition, in FIG. 2, the cooling port 500 is shown to correspond to only one of the pair of end plates 400, but the cooling port 500 may be formed on both sides, and in addition, even in the end plate 400 in which the cooling port 500 is not formed, the second mounting portion 420 may be additionally provided to particularly supplement structural weakness due to a large area. In addition, the second mounting portion 420 may be further provided according to the need for increased strength, and is not particularly limited.

One or more battery modules 100 according to the present exemplary embodiment may be mounted together with various control and protection systems such as a battery management system (BMS) and a cooling system to form a battery pack 1000.

Hereinafter, a battery pack according to an exemplary embodiment of the present invention will be described with reference to FIG. 4.

FIG. 4 is a partial perspective view of a battery pack according to an exemplary embodiment of the present invention.

As illustrated in FIG. 4, the battery pack 1000 of the present invention includes a battery module 100 and a pack frame 1100 accommodating the battery module 100. The pack frame 1100 may be positioned below the heat sink 300 of the battery module 100.

The battery module 100 may be fixed to the pack frame 1100 by the first and second mounting portions 410 and 420 included in the end plate 400. That is, each of the first and second mounting portions 410 and 420 includes through holes penetrating in a direction perpendicular to a direction protruding from the end plate 400, that is, in the z-axis direction in the drawing. In addition, the pack frame 1100 includes a fastening hole at a position corresponding to each of the through holes. When the through-hole and the fastening hole are aligned, the battery module 100 is fixed to the pack frame 1100 by fastening mounting bolts 700 penetrating through the through-hole and the fastening hole.

Here, two first mounting portions 410 may be present in one end plate 400 to correspond to both side end portions, and at least one second mounting portion 420 may be disposed between adjacent cooling ports 500, and thus, there may be three or more fixing points at which the first and second mounting portions 410 and 420 and the fastening hole of the pack frame 1100 are coupled to each other in one end plate 400. In this manner, by additionally providing the fixing point in the portion in which structural weakness may occur when the battery module 100 is fixed to the pack frame 1100, damage to the battery module 100 due to vibrations or impact or sagging due to the weight of the battery module 100 itself in the large-area, large-capacity battery module 100 may be prevented.

In these exemplary embodiments, terms indicating directions such as front, rear, left, right, up, and down are used, but these terms are for convenience of explanation only and may vary depending on a location of an object or a position of an observer.

The battery module or battery pack may be applied to various devices. Specifically, the battery module or battery pack may be applied to transportation means such as electric bicycles, electric vehicles, hybrid, etc., but are not limited thereto and may be applied to various devices that may use a rechargeable battery.

While the present invention has been described in connection with exemplary embodiments, it is to be understood that the invention is not limited to the disclosed exemplary embodiments, but, on the contrary, is intended to cover various modifications and equivalent arrangements included within the spirit and scope of the appended claims.

The invention claimed is:

1. A battery module comprising:
   a battery cell stack including a plurality of battery cells;
   a housing for the battery cell stack;
   a pair of end plates covering a front surface and a rear surface of the battery cell stack, wherein each of the pair of end plates is coupled to the housing;
   a heat sink positioned below a bottom portion of the housing, and
   at least two cooling ports connected to the heat sink,
   wherein each of the pair of end plates includes:
      at least one first mounting portion positioned between a side edge of the end plate and one of the at least two cooling ports adjacent to the respective side edge of the end plate, and extending in a protrusion direction of an electrode lead protruding from the battery cell; and
      at least one second mounting portion positioned between two adjacent cooling ports of the at least two cooling ports, and extending in the protrusion direction of the electrode lead protruding from the battery cell.

2. The battery module of claim 1, wherein:
   each of the at least one first mounting portion and the at least one second mounting portion includes a through-hole that penetrates through the first and second mounting portions, respectively, in a direction perpendicular to the protrusion direction.

3. The battery module of claim 1, wherein:
   the at least two cooling ports include a first cooling port and a second cooling port, and the first cooling port is a refrigerant injection port, and the second cooling port is a refrigerant discharge port.

4. The battery module of claim 1, wherein:
   the housing includes at least two housing protrusions protruding from a bottom portion of the housing at a position corresponding to the at least two cooling ports.

5. The battery module of claim 1, wherein:
a bottom surface of the housing forms an upper plate of the heat sink, and
the bottom surface of the housing is in contact with the refrigerant.

6. The battery module of claim 5, wherein:
the heat sink includes a depressed portion recessed from a plate-shaped body, and the depressed portion and the upper plate of the heat sink are coupled to form a refrigerant flow path.

7. The battery module of claim 6, wherein:
the depressed portion is a U-shaped tube, and the bottom surface of the housing is positioned on an open upper surface of the U-shaped tube.

8. A battery pack comprising:
at least one battery module according to claim 1; and
a pack frame positioned below the heat sink to accommodate at least one battery module.

9. The battery pack of claim 8, wherein:
each of the at least one first mounting portion and the at least one second mounting portion includes a through-hole that penetrates through the first and second mounting portions, respectively, in a direction perpendicular to the protrusion direction,
the pack frame includes fastening holes at positions corresponding to the through holes of the first and second mounting portions, respectively, and
mounting bolts coupled to the fastening holes of the pack frame through the through holes of the first and second mounting portions.

10. The battery pack of claim 9, comprising:
two first mounting portions, and
three or more points at which the first and second mounting portions and the corresponding fastening holes are coupled.

11. A device comprising the battery pack according to claim 8.

* * * * *